US007112351B2

(12) United States Patent
Affinito

(10) Patent No.: US 7,112,351 B2
(45) Date of Patent: Sep. 26, 2006

(54) METHODS AND APPARATUS FOR VACUUM THIN FILM DEPOSITION

(75) Inventor: John D. Affinito, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 10/374,540

(22) Filed: Feb. 25, 2003

(65) Prior Publication Data

US 2004/0011288 A1    Jan. 22, 2004

Related U.S. Application Data

(60) Provisional application No. 60/359,952, filed on Feb. 26, 2002.

(51) Int. Cl.
*C08J 7/18* (2006.01)
(52) U.S. Cl. ............................ 427/497; 427/509
(58) Field of Classification Search ................ 427/487, 427/496, 497, 255.28, 509
See application file for complete search history.

(56) References Cited

U.S. PATENT DOCUMENTS

| 4,842,893 A | | 6/1989 | Yializis et al. | |
|---|---|---|---|---|
| 5,440,446 A | * | 8/1995 | Shaw et al. ............... | 361/301.5 |
| 5,681,615 A | * | 10/1997 | Affinito et al. ........... | 427/255.6 |
| 6,103,331 A | * | 8/2000 | Kanno ....................... | 428/64.1 |
| 6,214,422 B1 | * | 4/2001 | Yializis ..................... | 427/488 |
| 2001/0041265 A1 | | 11/2001 | Yializis et al. | |
| 2004/0024105 A1 | * | 2/2004 | Kim et al. ................. | 524/492 |

OTHER PUBLICATIONS

P. W Atkins, Physical Chemsitry Ed2, 1982, pp. 188-190.*

* cited by examiner

*Primary Examiner*—D. Lawrence Tarazano
(74) *Attorney, Agent, or Firm*—Jacqueline M. Nicol; David E. Rogers; Squire, Sanders & Dempsey LLP

(57) ABSTRACT

The present invention provides a polymer coating method. In the method, in a vacuum chamber, a low temperature monomer evaporation chamber is used to heat a liquid monomer and a cooled substrate at a temperature lower than the liquid monomer reservoir or vapor. The liquid monomer is allowed to condense on the cooled substrate surface where it is polymerized by a radiation source. The process depends on the vapor pressure difference between liquid in the monomer source and liquid condensed on the surface of the cooled substrate. The film thickness is dependent on the temperature difference between the monomer reservoir and the substrate, and the time that is required to move the coated substrate from the evaporation chamber to the cure station. The method is suitable for forming very thin, uniform, pinhole-free, polymer coatings from a variety of monomers, having at least two olefinic groups per molecule, on a variety of substrates.

19 Claims, 7 Drawing Sheets

Solid lines = Flux entering vapor phase
Dashed lines = Flux leaving gas phase

Tripropylene Glycol Diacrylate

| T(K) | VP (mT) | LOGVP | A-B/T(K) | LOGVP - A-B/T(K) |
|---|---|---|---|---|
| 298.16 | 1 | 0 | 3.6538E-06 | 3.6538E-06 |
| 373.16 | 500 | 2.69897 | 2.69876512 | 0.00020489 |
| A | B | C | error= | 0.00020854 |
| 13.4276013 | 4003.57253 | 10.432162 | | |

| | | |
|---|---|---|
| Width of Evaporator = | 10 | cm |
| Distance to Cure = | 5 | cm |
| Web Velocity = | 10 | m/min |
| Vacuum Pump Speed = | 5000 | l/s |
| Evaporator Efficiency = | 100.00% | |
| SubstrateTemperature= | 10 | C |
| Density = | 1.04 | g/cm$^3$ |
| Molecular Weight = | 300 | g/Mole |

Hexanediol Diacrylate (SR238)

| T(K) | VP (mT) | LOGVP | A-B/T(K) | LOGVP - A-B/T(K) |
|---|---|---|---|---|
| 298.16 | 15 | 1.17609126 | 1.17609224 | 9.8101E-07 |
| 373.16 | 120 | 2.07918125 | 2.07910316 | 7.8087E-05 |
| A | B | C | | error= 7.9068E-05 |
| 5.66899296 | 1339.60328 | 2.61204718 | | |

| | | |
|---|---|---|
| Width of Evaporator = | 10 | cm |
| Distance to Cure = | 5 | cm |
| Web Velocity = | 10 | m/min |
| Vacuum Pump Speed = | 5000 | l/s |
| Evaporator Efficiency = | 100.00% | |
| Substrate Temperature= | 0 | C |
| Density = | 1.02 | g/cm$^3$ |
| Molecular Weight = | 226 | g/Mole |

METHODS AND APPARATUS FOR VACUUM THIN FILM DEPOSITION

This application claims priority to U.S. Provisional Application No. 60/359,952 filed by the same inventor on Feb. 26, 2002.

TECHNICAL FIELD

The present invention relates to methods for the vacuum deposition of materials on substrates under mild conditions. More particularly, the present invention relates to apparatus and methods for forming coatings on substrates by vacuum deposition and curing of thin films of monomers in which the monomers are vaporized under mild conditions.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

Coatings are applied to a wide variety of substrates for widely divergent purposes. Examples of the many different types of coatings in use include adhesive coatings, primer coatings, decorative coatings, protective hard coatings, anti-reflective coatings, reflective coatings, interference coatings, release coatings, dielectric coatings, photoresist coatings, conductive coatings, barrier coatings, and the like. Such coatings can be applied to substrates that are made from many different materials and have many different shapes. For example, in terms of materials, substrates may be metal, polymeric, ceramic, paper, mineral, glass, composite, and the like. In terms of shape, substrates may be flat, curved, undulating, smooth, rough, porous, particulate, fibrous, regular or irregular surfaced, and the like.

In conventional industrial coating processes, an admixture (for example, an emulsion, solution, slurry, two-phase fluid mixture, and the like) comprising the coating constituents and a suitable solvent is applied to the substrate using a suitable coating technique such as spraying, roll coating, brush coating, spin coating, or the like. The coated composition is then typically dried and cured in order to solidify the coating. During drying, the solvent is removed from the coating and then discarded or recovered.

Several solvent-free methods which avoid the expense or problems associated with removal, disposal, or recovery of solvents have been described for the deposition of thin polymer films onto substrates, such as polymers, metallized polymers, or metal foils and the like. For example, in U.S. Pat. No. 5,260,095 to Affinito, is described a method of depositing a thin layer of liquid monomer onto a moving substrate in a vacuum chamber and curing the thin layer. In U.S. Pat. No. 4,842,893 to Yializis et al. is described a coating method in which flash evaporation of monomer fluids from a heated surface forms vapor which is condensed on a substrate as a thin film and polymerized. In U.S. Pat. No. 6,045,864 to Lyons et al. is described a vapor coating method in which a carrier gas vaporizes a fluid composition and carries the vapor to a substrate upon which the vapor condenses and may be polymerized to form a coating. J. Affinito et al. (Affinito 1) in *Proceedings of the Fourteenth International Conference on Vacuum Web Coating*, pp. 77–94, ed. R. Bakish, Bakish Press (2000), and J. Affinito et al. (Affinito 2) in *Proceedings of the 44th Annual Technical Conference of the Society of Vacuum Coaters*, pp. 492–497 (2001), describe a thermal evaporation process and theoretical modeling for the deposition of lithium metal on polymer films.

There is a need for less costly and simpler solvent-free methods for providing thin film coatings for a variety of applications.

SUMMARY OF THE INVENTION

The polymer coating method of the present invention provides, in a vacuum chamber, a low temperature monomer evaporation chamber to heat a liquid monomer and a cooled substrate at a temperature lower than the liquid monomer reservoir or vapor. The liquid monomer is allowed to condense on the cooled substrate surface where it is polymerized by a radiation source. The process depends on the vapor pressure difference between liquid in the monomer source and liquid condensed on the surface of the cooled substrate. The film thickness is dependent on the temperature difference between the monomer reservoir and the substrate, and the time that is required to move the coated substrate from the evaporation chamber to the cure station. The method is suitable for forming very thin, uniform, pinhole-free, polymer coatings from a variety of monomers, having at least two olefinic groups per molecule, on a variety of substrates.

The method is further suitable for the controlled deposition of thin films at low web speeds of the substrate, for example, tens of nanometers (nm) at web speeds of less than a meter/minute. The ability to run the monomer coating process at low speeds makes the technique compatible with other in-line deposition methods such as, for example, sputtering. The method may also be used for batch coating processes, as it has the ability that the monomer source may be turned on and off for practical purposes instantly.

One aspect of the present invention pertains to a method of forming a polymer coating on a surface of a substrate in a vacuum chamber evacuated to a pressure of less than about $10^{-2}$ Torr, wherein the method comprises:

(a) heating a liquid monomer to form a vapor at a temperature below that at which thermal polymerization is initiated;

(b) allowing the vapor to flow to the surface of the substrate, the surface being at a temperature below the temperature of the monomer liquid or vapor in the evaporator;

(c) the vapor condensing on the substrate to deposit monomer on the surface; and (d) polymerizing the monomer of (c) to form the coating on the surface of the substrate.

In one embodiment, the vapor is formed in a heated chamber, wherein the chamber comprises sides and an aperture. In one embodiment, the chamber comprises parallel sides. The aperture may be gated and further may be adjustable to provide an opening having a cross-sectional area from about 0 to 30% of the surface area of the liquid monomer.

In one embodiment, the monomer in (a) is heated at a temperature of less than about 80° C. to form the vapor.

In one embodiment, the surface of the substrate is at a temperature of less than 30° C. In another embodiment, the surface of the substrate is at a temperature of less than 20° C. In one embodiment, the substrate is a web.

In one embodiment, the substrate is a web moving past the evaporation and radiation sources.

In one embodiment, the polymerization is induced by a radiation source comprising one or more of the group consisting of e-beam and ultraviolet radiation.

In one embodiment, the monomer has two or more olefinic groups per molecule, a molecular weight between 150 and 800. In one embodiment, the monomer had a vapor pressure in the range of $10^{-6}$ to $10^{-1}$ Torr at standard temperature and pressure.

In one embodiment, the vapor pressure of the liquid monomer is from $10^{-2}$ to $10^{-4}$ Torr at standard temperature and pressure. In one embodiment, the molecular weight of the monomer is from 160 to 500.

In one embodiment, the liquid monomer comprises one or more of the group consisting of glycol acrylates, polyglycol acrylates, and polyol polyacrylates. Preferably, the liquid monomer is selected from the group consisting of 1,6-hexanediol diacrylate, trimethylolpropane triacrylate, and tripropyleneglycol diacrylate.

In one embodiment, the coating formed in step (d) is from 0.005 µm to 10 µm in thickness. In another embodiment, the coating formed in step (d) is from 0.01 µm to 1 µm in thickness.

DETAILED DESCRIPTION OF THE INVENTION

Figure 1:
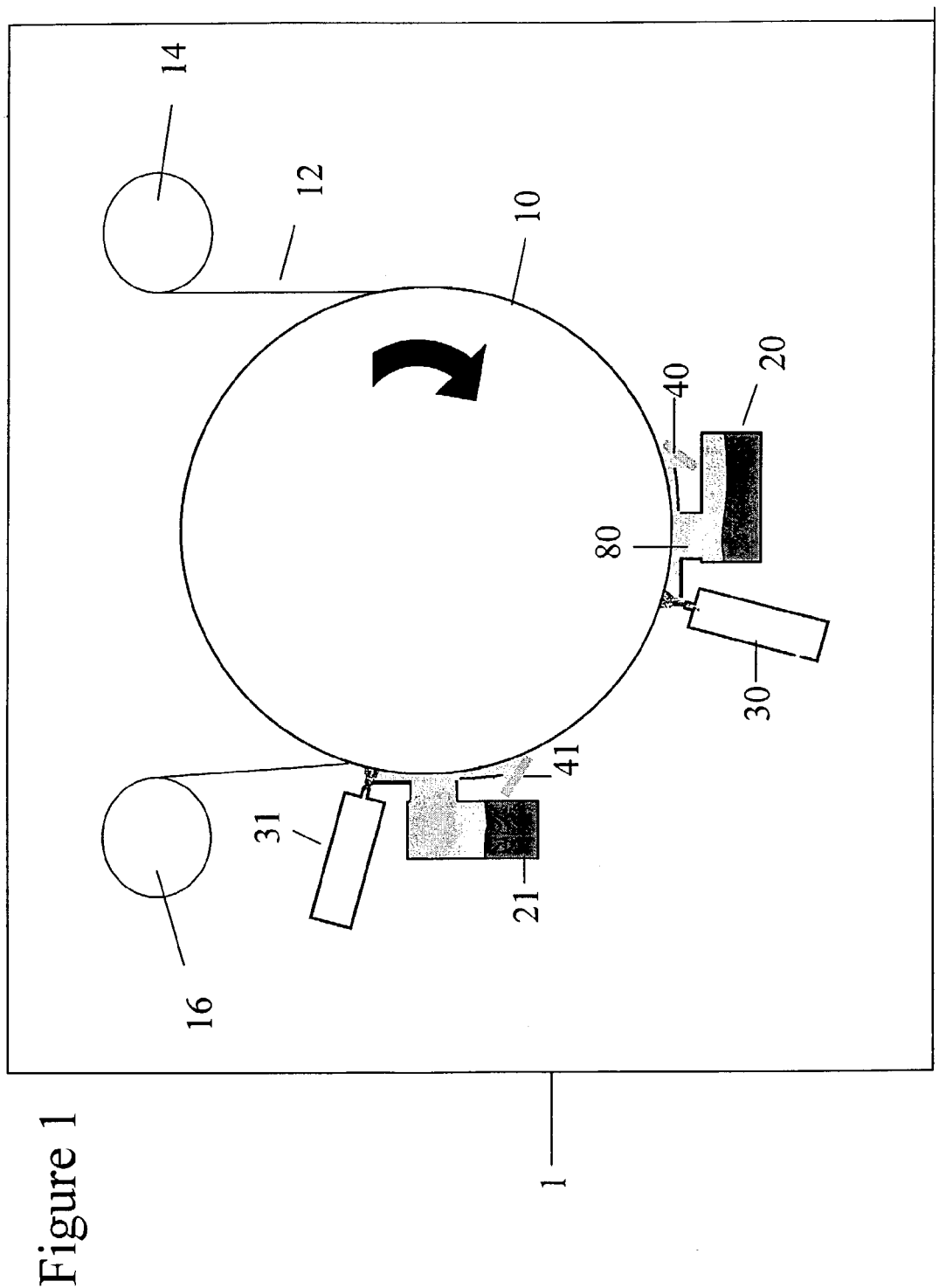
FIG. 1 is a schematic cross-sectional view illustrating an apparatus of one embodiment of the present invention.

Thin polymer coating layers free of defects and which can be deposited rapidly are valuable for a variety of applications, such as barrier films, protective coatings, release coatings, dielectric coatings, conductive coatings, and the like. The present invention provides improved methods for forming polymer coatings on the surface of a variety of substrates in a vacuum that are considerably simpler and avoid the disadvantages of other methods currently available.

One aspect of the present invention provides a method of forming very thin, preferably ultra smooth and pinhole-free, polymer films both at low web speeds and at high web speeds. The method employs a low temperature monomer evaporation chamber, such as less 80° C., and a cooled substrate. The methods of the present invention rely on the vapor pressure difference between the liquid in the monomer evaporation chamber and the liquid condensed onto the cooled substrate surface.

In contrast, the coating method of U.S. Pat. No. 4,842,893 to Yializis et al. (designated PML) employs flash evaporation of monomer, for example, at temperatures of 100° C. to 400° C., depending on the monomer, much higher than the temperatures used to heat and vaporize the monomer in the present invention. At these high temperatures undesirable polymerization occurs in the flash evaporation system that results in the rate of flow of monomer gradually decreasing during a run so that the deposition rate is not constant and the thickness of the polymer coating changes with run time. At low rates of deposition in the PML process low feed rates to the atomizer which feeds the flash evaporator, delivers monomer with pulses. This effect causes the deposited polymer films to vary in thickness. The present method provides a pulse-free flow of monomer vapor to the substrate independent of rate and polymer coatings of uniform thickness.

The method of the present invention is capable of essentially instant on and off operation, which makes it suitable for in-line batch coating. In contrast, the PML flash evaporation system due to the mechanical limitations of the monomer delivery/atomization step takes a significant time, e.g. tens of seconds to minutes, to reach a steady monomer vapor flow and longer for the flow of the monomer to stop when liquid monomer delivery system is switched off.

One aspect of the present invention provides a method for forming a polymer coating on a surface of a substrate in a vacuum chamber evacuated to a pressure of less than about $10^{-2}$ Torr, wherein the method comprises:

(a) heating a liquid monomer to form a vapor at a temperature below that at which thermal polymerization is initiated;

(b) allowing the vapor to flow to the surface of the substrate, the surface being at a temperature below the temperature of the monomer liquid in the evaporator;

(c) the vapor condensing on the substrate to deposit a monomer on the surface; and (d) polymerizing the monomer of (c) to form the coating on the surface of the substrate.

Suitable monomers for the practice of the present invention have a molecular weight between about 150 and 3,000. Suitable monomers consisting of the elements C, H and O have a molecular weight in the range of 150 to 800. Preferred monomers of the elements C, H and O have a molecular weight between 160 and 500. Suitable fluorocarbon monomers have a molecular weight between 300 to 3,000. Suitable monomers have a vapor pressure at standard temperature and pressure in the range of $10^{-6}$ to $10^{-1}$ Torr. Preferred monomers have a vapor pressure at standard temperature and pressure in the range of $10^{-2}$ to $10^{-4}$ Torr.

Preferably monomers for use in the methods of the present invention have two or more olefinic groups per molecule. Examples of suitable monomers include, but are not limited to, glycol diacrylates, polyglycol diacrylates, polyol polyacrylates, ethoxylated polyol polyacrylates, propoxylated polyol polyacrylates, acrylates with fluorocarbon groups, polyglycol vinyl ethers, and polyglycol divinyl ethers. Suitable glycol diacrylates include, but are not limited to, ethylene glycol diacrylate, 1,3-propanediol diacrylate, 1,4-butanediol diacrylate, 1,3-butylene glycol diacrylate, 1,6-hexanediol diacrylate, and neopentyl glycol diacrylate. Suitable polyglycol diacrylates include, but are not limited to, diethylene glycol diacrylate, triethylene glycol diacrylate, tetraethylene glycol diacrylate, tripropylene glycol diacrylate, polyethylene glycol diacrylates, and polypropylene glycol acrylates. Suitable polyol polyacrylates include, but are not limited to, trimethylol propane triacrylate, pentaerythritol tetraacrylate, and pentaerythritol triacrylate. Preferred are liquid monomers comprising one or more of the group consisting of glycol diacrylates, polyglycol diacrylates, and polyol polyacrylates. Preferred acrylate monomers are selected from the group consisting of 1,6-hexanediol diacrylate, tripropylene glycol diacrylate, and trimethylol propane triacrylate.

Although it is preferred to use a single liquid monomer in the methods of the present invention, mixtures comprising more than one monomer may be used. When mixtures comprising more than one monomer are used it is preferred that the vapor pressure, at standard temperature and pressure, of each monomer in the mixture be similar so that the ratio of the monomers in the vapor is very similar to that of the liquid monomers in the evaporation chamber. Suitable monomer components of monomer mixtures have vapor pressures, which differ by less than a factor of two from each other. Preferred are monomer components of monomer mixtures having vapor pressures, which differ by less than a factor of 1.5 from each other. More preferred are monomer components of monomer mixtures having vapor pressures, which differ by less than a factor of 1.2 from each other.

The vapor pressure of suitable monomers in the methods of the present invention may be used to calculate rates of deposition of the monomers on the cooled substrate, as described herein. Tabulations of vapor pressure versus temperature characteristics of organic liquids are also available in the literature, see for example, T. E. Jordan, *Vapor Pressure of Organic Compounds*, Interscience Publishers Inc., New York, 1954. By methods known in the art, vapor pressure of monomers can be measured if not already known.

The methods of the present invention are suitable for deposition of polymer coatings in continuous or batch processes. In a continuous process an elongated substrate, known as a web, is moved continuously at a steady rate past an aperture of an evaporation chamber and a radiation source. For deposition of polymer coatings in a batch mode one or more articles to be coated are moved into an area of the evaporation chamber aperture, the source is turned on and then off, to coat the articles, they are then cured in-situ or moved to a curing station where a radiation source is turned on and off, and the next batch moved into an area of the evaporation chamber.

A variety of materials may be used as substrates in the polymer coating methods of the present invention, such as, for example, polyester films, polyolefin films, metal films, and metallized polymer films.

The present invention is particularly useful as a method for the deposition of polymer coatings onto substrates at high rates under vacuum in a continuous process. One embodiment of the method and apparatus for continuous coatings is illustrated in cross-sectional view in FIG. 1. Referring to FIG. 1, a rotating cooling drum 10 is mounted in a vacuum chamber 1 evacuated with suitable pumps, as known in the art. A substrate 12, such as a web of polymer film or metal, is unwound from a supply spool 14, and onto the surface of the rotating cooling drum 10, such that the substrate is in intimate contact with the drum surface and is cooled. Cooling drums are known in the art of vacuum deposition such as for example as described by Yializis et al. in U.S. Pat. No. 4,842,893. As the cooling drum rotates, the substrate 12 moves past a monomer evaporation chamber 20 for liquid monomer arrayed around the cooling drum in the chamber. The monomer evaporation chamber 20 provides monomer vapor through an aperture 80 and the vapor condenses onto the cooled substrate 12, which is in intimate contact with the cooling drum 10. As the cooling drum 10 is further rotated condensed monomer deposited on the substrate moves past radiation source 30, which induces polymerization of the monomer to form a polymer coating layer on the substrate. The polymer coated substrate is then re-wound onto the take up spool 16.

A variety of radiation sources 30 are suitable in the methods of the present invention, including, but not limited to, one or more selected from e-beam, ultraviolet, and x-ray. Preferred radiation sources 30 are e-beam and ultraviolet sources.

In some applications of the present invention, it may be desirable to deposit more than one polymer layer onto the substrate. In these embodiments, the apparatus has more than one set of evaporation chambers and radiation sources arrayed around the cooling drum so that more than one polymer coating layer may be deposited. This is illustrated, for one embodiment in FIG. 1, where two evaporation chambers 20 and 21 and associated radiation sources 30 and 31, are arrayed around the cooling drum 10. The sequentially deposited polymer layers may be the same or different.

In yet another embodiment, in addition to the one or more polymer coating processes other deposition processes, for example sputtering, may precede or follow the one or more polymer coating steps to deposit layers such as, for example, metals, metal oxides, metal nitrides and ceramics. Such layers may also be deposited between polymer coating layers. Metal layers which may be deposited on the polymer coating layers by sputtering include, but are not limited to, inconel, aluminum, nickel, and copper. Metal oxide layers which may be deposited on the polymer coating layers by sputtering include, but are not limited to, alumina, magnesia, silica, ziconia, and titania.

Figure 2:
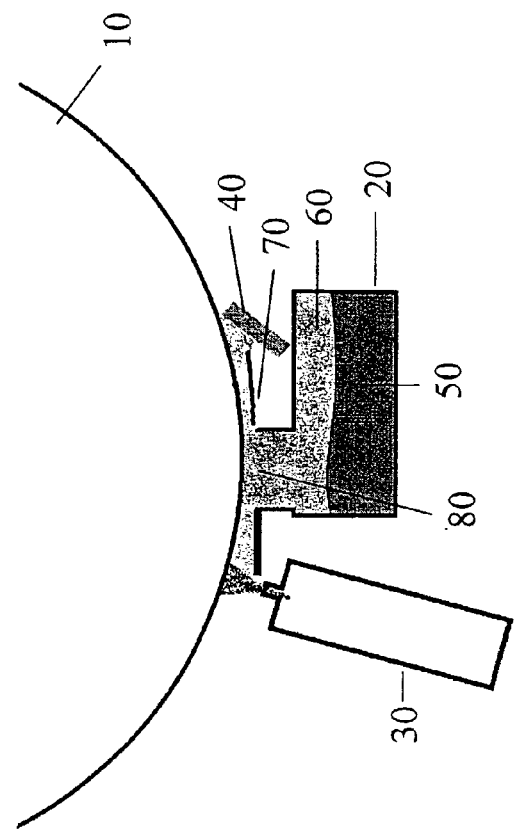
FIG. 2 is a schematic cross-sectional view of a monomer evaporation chamber and radiation source of the present invention.

In FIG. 2 is illustrated a more detailed view of one embodiment of a monomer evaporation chamber and radiation source of the present invention. Referring to FIG. 2, the evaporation chamber 20 contains liquid monomer 50, which is heated to generate vapor 60. The evaporation chamber 20 has an aperture 80 through which monomer vapor 60 moves toward the cooled substrate 12 in contact with the cooling drum 10. The size of the aperture 80 of the evaporation chamber may be controlled by the movement of shutter 70. By changing the aperture size the thickness of the deposit layer can be controlled. A Cryo-shield 40 traps vapor monomer and protects substrate 12 and cooling drum 10 from heating by radiation from the evaporation source.

The evaporation chamber 20 is provided with heating elements (not pictured) to heat and maintain the liquid monomer and the evaporation chamber 20 walls at moderate temperatures, such as no more than about 80° C. The evaporation chamber 20 is designed to maintain an essentially equal temperature for the liquid monomer and for the chamber walls. The temperature of the liquid monomer in the evaporation chamber 20 is below the temperature at which the monomer will polymerize during a coating run. Simple experimentation may be used to determine the temperature at which polymerization of the monomer will occur in the evaporation chamber 20 under process conditions. The temperature at which the monomer will be heated in the evaporation chamber 20 to generate monomer vapor should be lower than the polymerization temperature, for example, approximately 10 to 15° C. below the polymerization temperature. Suitable monomers in the methods of the present invention, as described above, may typically be heated in the evaporation chamber 20 at temperatures in the range of about 50 to 80° C.

The capacity of the evaporation chamber 20 is preferably large enough to supply enough monomer vapor for a complete run, i.e. to completely coat a web of substrate. The geometry of the evaporation chamber 20 will allow generation of monomer vapor over a wide range of rates, which can be controlled precisely by the heat input to the evaporation chamber. In this manner, for example, thin films of from about 0.005 µm to about 10 µm may be deposited at a variety of rates and with small variations in thickness over the full length of a web. In one embodiment, the polymer coating produced by the method of the present invention is from about 0.005 µm to about 10 µm in thickness. In one embodiment, the polymer coating produced by the method of the present invention is from about 0.01 µm to about 1 µm in thickness. In particular, it should be noted that the resultant film thickness formed by the present invention are a function of the temperature difference between the monomer reservoir and the substrate, and the time that is required to move from the evaporator to the cure station. The rate of the web speed will also determine the polymer coating thickness.

A variety of designs may be used for the evaporation chambers 20 of the present invention. For example, a variety of wall geometries and aperture configurations may be used. Suitable evaporation chambers 20 for the methods of the present invention, are characterized by a constant surface area of liquid monomer from which monomer evaporates and an aperture which is gated so that the aperture size can be adjusted to adjust the rate of deposition and thickness of the monomer layer. A wide range of cross-sectional areas of the aperture size may be used in the present invention. Preferably, the cross-sectional area of the aperture during the coating process may be from about 1 to 30% of the surface area of the liquid monomer. More preferably the cross-sectional area of the aperture in the coating process is from 2 to 25% of the surface area of the liquid monomer. Most preferably, the cross-sectional area of the aperture in the coating process is from 3 to 15% of the surface area of the liquid monomer. The gate or shutter may be used to completely close the aperture prior to a run or at the completion of a run, thereby providing an instant on-off switch. The aperture may also be used to control coating for a batch process or to coat patterns on a substrate, for example by opening and closing the gate over the aperture. Since the temperature in the evaporation chamber is usually less than about 80° C., a simple O-ring sealed plate may be used for the shutter. In a batch coating process the shutter would be opened as the substrate arrives and closed immediately after it passed.

Figure 3:
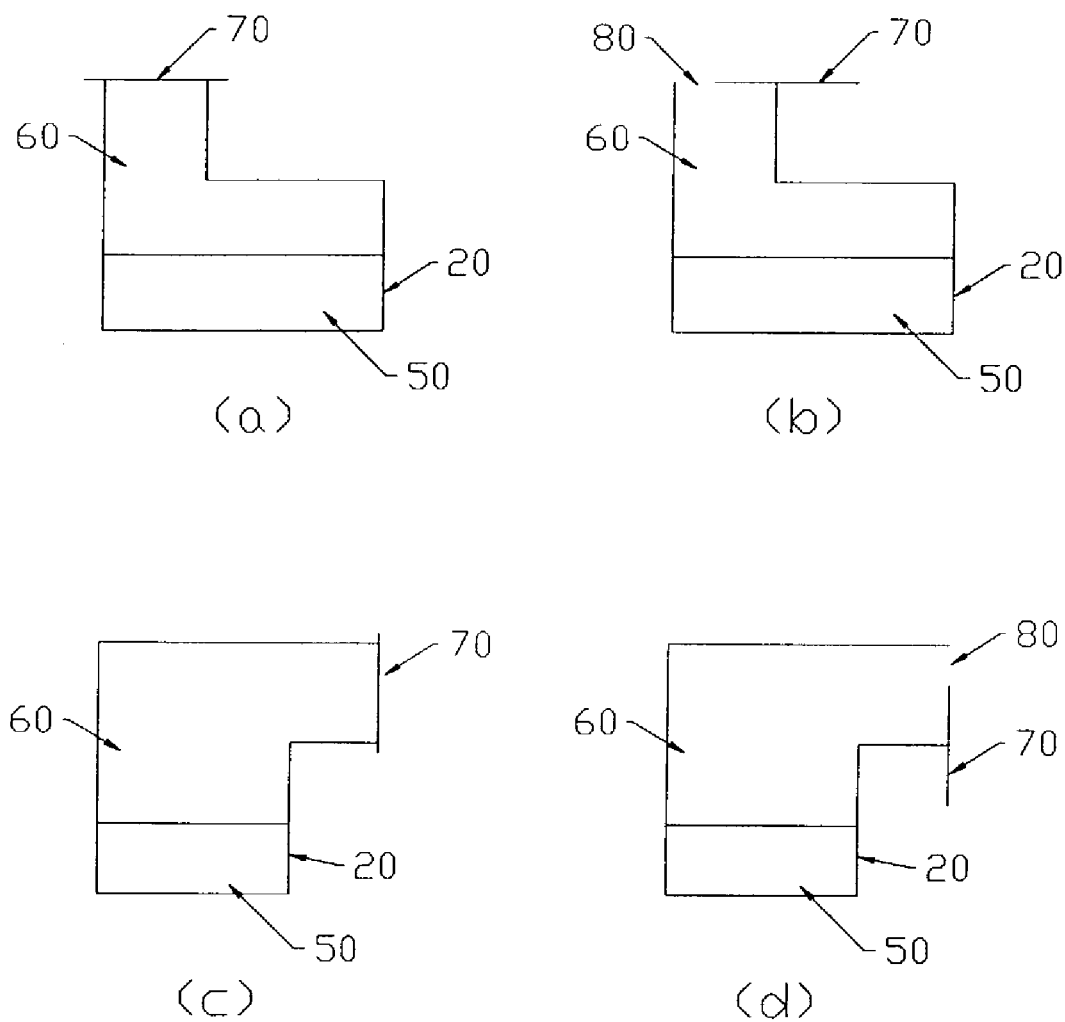
FIG. 3 is a schematic cross-sectional view of two embodiments of the evaporation chamber 20 of the present invention.

FIG. 3 illustrates two embodiments of suitable evaporation chambers. Referring to FIG. 3, a and c illustrate two possible configurations of the evaporation chamber 20 in which the gate or shutter 70 is in the closed position. FIGS. 3b and 3d illustrate the opening of the shutters 70 of the evaporation chambers in FIGS. 3a and 3c, respectively, to provide an aperture 80 through which monomer vapor 60 moves to the substrate where it is deposited. Suitable evaporation chambers have a base with vertical walls, which maintain the surface area of the liquid constant as the liquid monomer evaporates during the coating process. The evaporation chambers 20 contain liquid monomer 50.

The substrate is cooled by contact with the cooling drum to a temperature preferably in the range of 0° C. to about 30° C. It is desirable to maximize the temperature difference between the substrate and the monomer vapor from the evaporation chamber. The substrate temperature must not be below the temperature at which the mobility of the condensed liquid monomers is too low to permit proper polymerization. Below the temperature at which mobility is too low, polymerization of the monomer yields a hazy, crumbly, or powdery solid. An acceptable substrate temperature yields a clear, tough, polymer film layer. In one embodiment, the substrate is cooled at a temperature below about 30° C. In another embodiment, the substrate is cooled at a temperature below about 20° C. For each specific monomer, the minimum temperature for the substrate may be determined by experimentation. For example, for monomer 1,6-hexanediol diacrylate the minimum temperature for the substrate is approximately 0° C., and for monomer tripropylene glycol diacrylate the minimum temperature for the substrate is approximately 10° C.

Rates of deposition in the methods of the present invention may vary from less than 1 m/minute to about 300 m/minute. Suitable rates are from 1 m/minute to about 100 m/minute for coatings of a range of thickness, for example, from about 10 nm to 10 µm.

It is unexpected that the simple method of the present invention of coating thin polymer layers on a substrate can be effective. For example, Shaw, in *Society of Vacuum Coaters*, 34$^{th}$ *Annual Technical Proceedings*, 1991, 180–182, in describing a coating method involving flash evaporation of acrylate monomers, states that "acrylate monomer is an extremely reactive liquid that will quickly polymerize during heating. Common liquid evaporation systems could not be used because of this high reactivity." In contrast to this assertion it is now found that a simple evaporation system can be used to provide monomer vapor for polymer coatings as described in the methods of the present invention. Furthermore, the method has the advantage circumventing the undesirable polymer fouling typically found in flash evaporators in flash evaporation methods.

This coating process can be used in many different endeavors. For example, this coating process can be used to form anodes for use in electrochemical cells such as Li—S batteries. These batteries can be used in any number of consumer electronic products, consumer electronic products are portable computers, phones, personal digital assistants, electronic games, video and digital cameras and the like.

In an embodiment, an anode for use in an electrochemical cell is manufactured by first depositing a layer of lithium or a web using conventional means such as sputtering. Then, one or more polymer layers can be applied using the methods discussed previously. In another embodiment, the protective layer is formed on the lithium layer prior to depositing the polymer layers. Pending U.S. patent application Ser. No. 09/721,578 to Skotheim entitled "Lithium Anodes for Electrochemical Cells" and filed on Nov. 21, 2000, discloses multiplayer layer anodes and is hereby incorporated by reference.

In another embodiment, an anode for use in an electrochemical cell can be manufactured by first depositing a crosslink polymer layer such as an alkyl acrylate layer onto a web, such as a polyethylene terephtholate web using the methods described in the present invention. Next, a layer of lithium can be deposited via sputtering or some other well known technique of depositing a metal layer. Anodes having this structure are disclosed in U.S. 60/258,105, U.S. application Ser. No. 10/025,651 and PCT/US01/49170 all to Mikhaylik, all of which are hereby incorporated by reference.

The anodes can be used in conjunction with an appropriate cathode, such as a cathode comprising sulfur and an appropriate electrolyte to form an electrochemical cell.

Modeling of Monomer Deposition

The vapor pressure of any liquid in equilibrium with its vapor can be calculated by equating the molar Gibbs free energies of the liquid and vapor phases and rearranging terms, with the assumption that there are no chemical reactions or flux losses, see for example J. O Hirschfelder et al., in *Molecular Theory of Gases and Liquids*, Chapter 4, page 283, John Wiley & Sons, New York, 1954. The resulting expression for vapor pressure depends only on the Kelvin temperature (T), the molar enthalpy of vaporization ($\Delta H_{evap}$), and the molar volume of the gas ($V_m$). Thus for systems in equilibrium it is only necessary to know the temperature in order to determine impingement rates from the gas to the liquid surface, or emission rates from the liquid to the gaseous volume (vapor pressures), assuming that the molar enthalpy of vaporization for the material is known.

For any single component evaporation process it has been observed (see for example S. Dushman, rev. L. R. Koller, *Scientific Foundations of Vacuum Technique*, ed. J. M. Lafferty, Chapter 10, pp. 691–703, John Wiley and Sons, 1962) that the equilibrium vapor pressure (P) of the gas in millitorr above the liquid can be represented as a function of temperature by the relationship:

$$P = 10^{(A-\frac{B}{T})} \quad \text{Equation 1}$$

where A and B are constants which depend upon the material that is evaporating, and T is the temperature of the liquid, gas, and enclosure surfaces in degrees Kelvin (° K). The thermal equilibrium conditions, under which Equation 1 is derived, are equivalent to the liquid being in a sealed enclosure, with no chemical reactions and with the liquid, vapor and all surfaces at the same temperature ($T_{liq}=T_{gas}=T_{surfaces}$). From this relationship if the vapor pressure and temperature is known at two or more points, Equation 1 may be solved to determine the vapor pressure at any temperature.

This may be extended, as described in Dushman, to yield the rate, W(T), in g/cm²s of areal mass evaporation/impingement from/to a liquid surface in equilibrium with its vapor at temperature T as:

$$W(T) = 10^{(C-0.5 \cdot \text{Log}(T) - \frac{B}{T})} \quad \text{Equation 2}$$

where C and B are constants that depend upon the material that is evaporating. B is the same as B in Equation 1, and C is a function of A and the molecular weight.

Tabulations of the vapor pressure versus temperature characteristics of organic liquids, and the fitting of this data to theory as described in Hirschfelder et al. have been described, for example, in *Vapor Pressure of Organic Compounds*, T. E. Jordan, Interscience Publishers, Inc., New York, 1954. Similar tabulations and analyses have also been published for solids, such as metals, that have been melted and the resultant liquid is in equilibrium with its vapor in, for example Dushman.

Non-Equilibrium Evaporation Process Analysis for Metals

Equation 2, however, still assumes thermal equilibrium of the system. J. Affinito et al. (Affinito 1), *Proceedings of the Fourteenth International Conference on Vacuum Web Coating*, pp. 77–94, ed. R. Bakish, Bakish Press, (2000), and J. Affinito et al. (Affinito 2), *Proceedings of the 44th Annual Technical Conference of the Society of Vacuum Coaters*, pp. 492–497 (2001), have shown that the approach described above for systems in equilibrium can be extended to non-equilibrium situations where metals are evaporated onto substrates and there is both flux lost from the system, and the liquid, gas, and system walls are at different temperatures. Specifically, the relaxation of the constraint on the applicability of Equations 1 and 2 permits modeling of real systems. It allows for species to condense, for practical purposes, permanently onto surfaces. Species may escape from the evaporation enclosure entirely, and the realistic situation where $T_{liq} \neq T_{gas} \neq T_{surfaces}$ can be modeled. Affinito 1 and 2 demonstrated the validity of this approach for the specific case of Li evaporation from a complex geometry evaporator under non-equilibrium conditions.

Affinito 1 and 2 has shown that Equations 1 and 2 (with either the surface or gas temperature) may be applied to any evaporation situation, and any surface, in which the species entering the gas phase from a surface is the same as the species impinging on that surface from the gas phase. That is, Equations 1 and 2 will always apply when only thermal processes are important, i.e. as long as there are no chemical reactions or non-thermal physical bombardment processes taking place in the gas or liquid phases, or on the surfaces.

Figure 4:
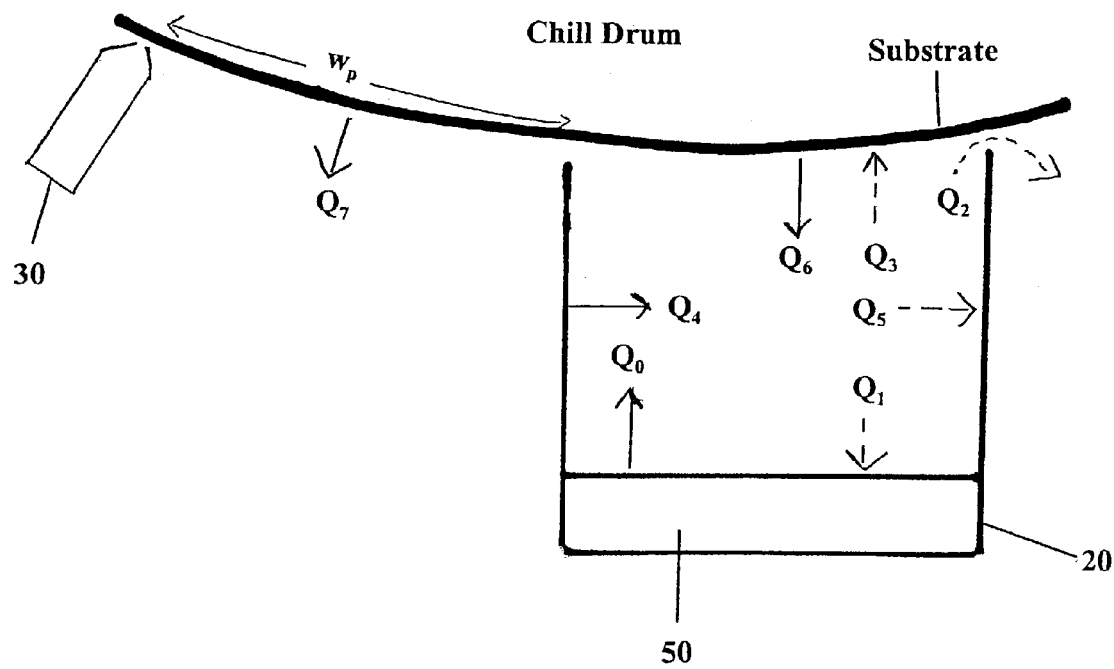
FIG. 4 shows a mass balance diagram used in modeling of the present invention: for monomer vaporization and deposition on a substrate.

In the case of a system, such as when a metal is evaporated onto a surface and there is negligible re-vaporization from that surface, a mass balance analysis can be used to develop equations of constraint that connect all of the evaporated flux streams within a system (Affinito 1 and 2). The basis of the analysis is that the Mass Flux Rate (Q), in g/s, leaving any surface at a given temperature, T is given from Equation 2, as W($T_{surface}$) times the area of the surface, in cm², while the Mass Flux Rate impinging upon any surface is given by W($T_{gas}$) times the area of the surface. The constraint arises by requiring that the Total Flux Rate that enters the gas phase (due to emission from all surfaces) must exactly match the Total Mass Flux Rate that condenses onto all surfaces plus the flux that escapes from the system, i.e. conservation of flux must be preserved. That is $$Q_0 - Q_1 - Q_2 - Q_3 - Q_5 + Q_4 = \text{Zero}$$

where $Q_0$, $Q_1$, $Q_2$, $Q_3$, $Q_4$, and $Q_5$ are mass flux rates for different surfaces. These surfaces and mass flux rates are shown in FIG. 4. (Note in FIG. 4 fluxes $Q_6$ & $Q_7$ are also shown which apply only to the model of the present invention for monomer evaporation and deposition.

As the liquid temperature and all surface temperatures are known, the analysis requires a specific temperature distribution of the gas within the evaporator in order to balance all of the flux. In a wide variety of situations the gas turns out to be isothermal (Affinito 1 and 2). An isothermal gas distribution is represented by a single temperature, and allows a simple algebraic solution of the constraint equation for a single value of $T_{gas}$. If the gas is not isothermal then a self-consistent boundary value problem must be solved by known methods in order to determine $T_{gas}$ as a function of position. In either situation the local value of $T_{gas}$ determines the local impingement rate, and the local value of $T_{liq}$ or $T_{surface}$ determines the local emission rate.

Non-Equilibrium Analysis for Monomer Vaporization and Deposition

The approach of Affinito 1 and 2 for the vapor deposition of metals may be extended, as described herein, to the modeling of monomer evaporation and condensation processes where constraints of re-evaporation from the surface of the condensed layer on the substrate must also be considered. This allows for the demonstration of the engineering and construction of evaporators for which the film thickness, chamber pressure, and all relevant rates of change may be calculated from Equations 1 and 2, system geometry and the elementary principles of Kinetic Theory, as described herein.

In the present invention a model has been developed to describe the non-equilibrium system of a monomer vaporizing and condensing on a substrate, where in addition to the flux rates (Q) described in Affinito 1 and 2, mass flux rates for re-vaporization of monomer condensed on the substrate inside the evaporator sources ($Q_6$), and for re-vaporization of monomer condensed on the substrate which occurs between the end of the evaporator source and beginning of the polymerization/cure source ($Q_7$) must also be considered. FIG. 4 illustrates the mass flux rates considered in modeling the present invention, where mass balance constraints inside the vaporization source require that:

$$Q_0 - Q_1 - Q_2 - Q_3 - Q_5 + Q_4 + Q_6 = \text{Zero}$$

In units of g/cm²s, W(T) in Equation 2 allows calculation of the rate of the areal mass impingement onto or emission from any surface as long as $T_{gas}$, for impingement or $T_{surface}$ for emission is known. If the surface has an area A cm², then the Total Mass Flux Rate, (Q) (emission or impingement) in g/s is given as:

$$\text{Total Mass Flux Rate} = W(T) \cdot A \qquad \text{Equation 3a}$$

If the total time t in second (s) that the area A in cm² is emitting or receiving the flux is also known, then the Total Mass Flux in g can be calculated as:

$$\text{Total MassFlux} = W(T) \cdot A \cdot t \qquad \text{Equation 3b}$$

If the density $\rho$ (in g/cm³) of the impinging/condensing material is known, the total accumulation of thickness, denoted as "d" and measured in μm, on the surface (for impingement) or depletion (for emission), may be calculated as:

$$d = 10^4 \cdot \frac{W(T) \cdot A \cdot t}{\rho \cdot A} = 10^4 \cdot \frac{W(T) \cdot t}{\rho} \qquad \text{Equation 3c}$$

If the substrate is not stationary, as in the case of a moving web substrate, and the exposure time t actually results from the substrate moving past an aperture of width w, in cm, at velocity V, in m/minute, then the thickness, d in μm, is given as:

$$d = 10^4 \cdot \frac{W(T) \cdot w}{\rho \cdot V} \cdot \left(\frac{60}{100}\right) \qquad \text{Equation 3d}$$

In steady state, flux must be continually both impinging on and be emitted from all surfaces in the system. Further, for any particular surface if $T_{gas} > T_{suface}$ there will be a net accumulation of material on that surface. Contrariwise, for any particular surface if $T_{gas} < T_{surface}$ there will be a net loss of material from that surface. Thus, under steady state conditions, surfaces at temperatures below $T_{gas}$ will act as flux sinks while surfaces at temperatures above $T_{gas}$ will act as a flux source.

Model

Figure 5:
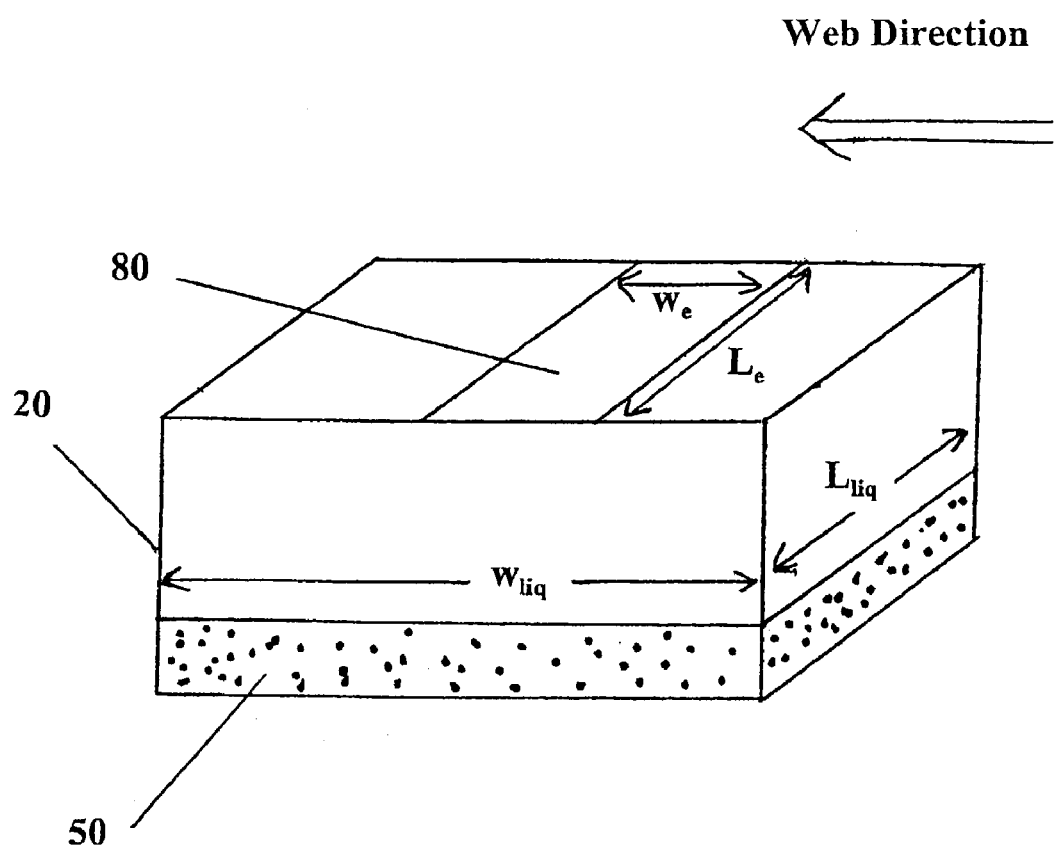
FIG. 5 shows the dimensions of the evaporator and web substrate of the present invention.

For a monomer evaporator a model has been developed assuming a rectangular liquid surface of area $A_{liq} = L_{liq} \cdot w_{liq}$ (where $L_{liq}$ is the length and $W_{liq}$ is the width of the liquid surface), and a rectangular evaporator aperture of area $A_e = L_e \cdot w_e$ (where $L_e$ is the length and $w_e$ is the width of the evaporator aperture). FIG. 5 shows the widths for a simple evaporation source in which $w_e$ and $w_{liq}$ are measured in the direction of travel of the web and $L_{liq}$ and $L_e$ are measured perpendicular to the direction of travel. The width of the web, P, however, is measured perpendicular to the direction of travel of the web, while the web length is measured in the direction of web travel. The substrate temperature, $T_{sub}$, is taken as $T_{sub} < T_{liq}$, where $T_{liq}$ is the temperature of the monomer liquid in the evaporator, and all evaporator surfaces are taken equal to $T_{liq}$. From calculations based on mass balance constraints, (FIG. 4) as described above, one finds that if any flux is lost or if any of the evaporator walls (or the substrate) are at lower temperature than $T_{liq}$, while no surfaces exceed $T_{liq}$, then $T_{gas}$ must be less than $T_{liq}$. In the case of this model, some flux may escape at the aperture opening ($Q_2$) and some flux may build up on the substrate ($Q_3$) (while the substrate is over the aperture) since $T_{sub} < T_{liq}$. Since all other surfaces are at $T_{liq}$, which is higher than $T_{gas}$, flux does not build up on any other surfaces. Thus, in the model, the rate that flux is emitted from any non-substrate surface is greater than the rate at which it impinges upon that surface (because $T_{surface} > T_{gas}$). Therefore, the walls may be neglected in the analysis and the only parameters required to calculate $T_{gas}$ are $T_{liq}$, $T_{sub}$, $A_{liq}$, and $A_e$ (actually as $A_{liq}$ and $A_e$ are not independent, only the ratio $A_e/A_{liq}$ is required). Although in the present model it has been assumed that evaporator surfaces are as $T_{liq}$ for simplification of the calculations, walls of different temperatures may be included. For example, in Affinito 1 and 2, walls were included that not only were less than $T_{liq}$, but had a 100° C. gradient across them. However, it may be demonstrated that any complex geometry and gradient-containing evaporator may be mathematically mapped into an equivalent simplified rectangular evaporator with all walls at $T_{liq}$ and then analyzed with a model as used herein.

$T_{gas}$ is determined by solving the constraint equations (see FIG. 4), described above, which, amounts to summing all of the W(T)·A products, Total Mass Flux Rates, at all surfaces in the system (using $T_{gas}$ for impingement and $T_{surface}$ for emission) and then finding the value of $T_{gas}$ that makes the sum go to zero.

The thickness accumulated on the substrate is then calculated in the most general case for a uniform temperature substrate as a sum from as many as 3 fluxes. The flux that condenses onto the substrate as the substrate passes the aperture yields, by Equation 3d, the maximum thickness that can actually accumulate on the substrate. If the substrate is so cold that, for practical purposes, no condensed flux is ever re-emitted then this is the only term of the sum that must be considered. This is the case for lithium condensing onto a moving web below about 300° C., as described in Affinito 1 and 2. If the substrate temperature is high enough to allow substantial re-emission then more terms are needed. In the case of the present invention for deposition of liquid monomers, for example acrylate monomers, onto a near room temperature substrate, the condensed liquid monomer will be re-emitted constantly, both while the substrate is over the evaporator aperture and after the substrate has left the region above the evaporator aperture. Thus, unless the liquid monomer condensed onto the substrate is polymerized by some means, all of the monomer will eventually evaporate from the surface of the substrate. If the monomer is polymerized to form a solid at a position $w_p$ cm after passing the evaporator aperture (i.e. the distance between the exit from the evaporator and the start of the curing station) then the total accumulated polymer thickness can be calculated, through the use of Equation 3d, by calculating the monomer thickness condensed over the evaporator aperture minus the monomer thickness re-emitted over the evaporator aperture minus the monomer thickness re-emitted as the substrate travels from the evaporator aperture to the cure position. If the model is used for a batch coating process the re-emission area is the actual area of the coated part.

For purposes of the total thickness, d, calculation, it is not actually necessary to artificially decompose the re-emission process into a portion over the evaporator and a portion outside of the evaporator. However, some portion of the gas that is re-emitted over the evaporator actually returns to the evaporator and must be accounted for when calculating $T_{gas}$. The portion that is re-emitted from the surface of the web over the evaporator that does not return to the evaporator, plus the monomer re-emitted from the surface of the web outside of the evaporator goes into the vacuum chamber at large and contributes to the total gas load on the pumps and raises the chamber pressure. Thus, for these other reasons, it is convenient to decompose the re-emitted flux into these two contributions.

When liquid acrylate monomer of density $\rho$ g/cm³ condenses from gas at $T_{gas}$ ° K onto a web at $T_{sub}$ ° K, through an aperture $w_e$ cm wide, with the web moving at V m/min, and is polymerized a distance $w_p$ cm after exiting the aperture of the evaporator, the resultant polymer thickness in μm is either:

$$d = \frac{10^4}{\rho \cdot V}[W(T_{gas}) \cdot w_e - W(T_{sub}) \cdot w_e - W(T_{sub}) \cdot w_p] \cdot \left(\frac{60}{100}\right) \quad \text{Equation 4a}$$

or:

$$d = \frac{10^4 \cdot w_e}{\rho \cdot V}\left[W(T_{gas}) - W(T_{sub}) \cdot \left\{1 + \frac{w_p}{w_e}\right\}\right] \cdot \left(\frac{60}{100}\right) \quad \text{Equation 4b}$$

Thus Equation 4a shows that the thickness of the polymer film reaching the curing station is a function of the amount of vapor condensing on the substrate minus the amount re-evaporated in the evaporator chamber minus the amount re-evaporated between the edge of the evaporator and the cure station (distance $w_p$). (Note that for some evaporator geometries the edge of the evaporator and the edge of the aperture will be the same.)

Note that, in Equations 4a and 4b, the duration, for each step of the process, is given as $(60/100) \cdot (w/V)$ seconds, where w is the width of the particular process zone under consideration and V is the web movement speed. Thus, d in μm may also be written in terms of elapsed times as:

$$d = \frac{10^4}{\rho}[W(T_{gas}) \cdot t_e - W(T_{sub}) \cdot t_e - W(T_{sub}) \cdot t_p] = \quad \text{Equation 4c}$$

$$\frac{10^4}{\rho}[\{W(T_{gas}) - W(T_{sub})\} \cdot t_e - W(T_{sub}) \cdot t_p]$$

Process Stability and Gradients

While Equations 4 a-c will yield the polymer thickness obtained after polymerization, it is also important in any manufacturing process to understand the stability of the process with respect to fluctuations in the hardware, material, and process parameters. The resultant polymer film thickness, as given by Equations 4, is a function of $T_{gas}$, $T_{sub}$, V, $w_e$, $w_p$, $\rho$ and indirectly, through W(T) in Equation 2, B and C. The first three variables, $T_{gas}$, $T_{sub}$, and V, are process parameters, the middle two, $w_e$, and $w_p$, are evaporator design parameters, and the last three, $\rho$, B and C, are material parameters. Differentiation of Equations 4 with respect to each of these parameters in turn will yield the gradients of d with respect to each parameter, i.e. the change in d per unit change in the parameter of differentiation. The magnitudes of these gradients reveal the stability of the process with respect to fluctuations in the variables. For instance, a gradient of $10^6$ μm per degree ° C. change in $T_{gas}$ would mean that if the temperature set point varied by only 1° C., the thickness would vary by 1 meter, and the process would be unstable. A change of $10^{-3}$ μm per degree ° C. in $T_{gas}$, on the other hand, would be very stable with a variation of only 1.0 nm for a 1° C. change in $T_{gas}$. Calculation of gradients also show that if the gradient is too large, and there is too much time between the condensed monomer on the substrate leaving the evaporator source and entering the cure area, there will be too much re-vaporization of the monomer and control of, for example, the thickness and quality of the polymer film formed will be poor.

The gradients used with the model are listed below (units are given in parentheses):

$$\frac{\partial d}{\partial T_{gas}} = \frac{\ln(10) \cdot 10^4 \cdot w_e}{\rho \cdot V} \cdot W(T_{gas}) \cdot \left[\frac{B}{T_{gas}^2} - \frac{0.5 \cdot \text{LOG}(e)}{T_{gas}}\right] \cdot \left(\frac{60}{100}\right)\left(\frac{\text{um}}{°C}\right) \quad \text{Equation A1}$$

$$\frac{\partial d}{\partial T_{sub}} = -\frac{\ln(10) \cdot 10^4 \cdot (w_e + w_p)}{\rho \cdot V} \cdot W(T_{sub}) \cdot \left[\frac{B}{T_{sub}^2} - \frac{0.5 \cdot \text{LOG}(e)}{T_{sub}}\right] \cdot \left(\frac{60}{100}\right)\left(\frac{\text{um}}{°C}\right) \quad \text{Equation A2}$$

$$\frac{\partial d}{\partial V} = -\frac{d}{V}\left(\frac{\text{um}}{\text{m/min}}\right) \quad \text{Equation A3}$$

$$\frac{\partial d}{\partial w_e} = \frac{10^4}{\rho \cdot V} \cdot [W(T_{gas}) - W(T_{sub})] \cdot \left(\frac{60}{100}\right)\left(\frac{\text{um}}{\text{cm}}\right) \quad \text{Equation A4}$$

$$\frac{\partial d}{\partial w_p} = \frac{10^4}{\rho \cdot V} \cdot W(T_{sub}) \cdot \left(\frac{60}{100}\right)\left(\frac{\text{um}}{\text{cm}}\right) \quad \text{Equation A5}$$

-continued $$\frac{\partial d}{\partial \rho} = -\frac{d}{\rho} \left( \frac{\text{um}}{\text{g/cm}^3} \right)$$

Equation A6

$$\frac{\partial d}{\partial C} = \ln(10) \cdot d \left( \frac{\text{um}}{\text{unitC}} \right)$$

Equation A7

$$\frac{\partial d}{\partial B} = -\frac{10^4 \cdot \ln(10)}{\rho \cdot V} \left[ \frac{W(T_{gas}) \cdot w_e}{T_{gas}} - \frac{W(T_{sub}) \cdot w_e}{T_{sub}} - \frac{W(T_{sub}) \cdot w_p}{T_{sub}} \right] \left( \frac{\text{um}}{\text{unitB}} \right)$$

Equation A8

$$\frac{\partial d}{\partial t_e} = \frac{10^4}{\rho} \cdot [W(T_{gas}) - W(T_{sub})] \left( \frac{\text{um}}{s} \right)$$

Equation A9

$$\frac{\partial d}{\partial t_p} = \frac{-10^4}{\rho} \cdot [W(T_{sub})] \left( \frac{\text{um}}{s} \right)$$

Equation A10

The time and temperature derivatives above are most useful in providing insight into the stability of the process, as described herein, with respect to variations in the vapor and substrate temperatures, as well as the transit times between deposition and cure. In principle the physical dimensions may be measured and known with extreme accuracy. However, temperature and time (through velocity) must be experimentally controlled and offer the most chance for uncertainty and error. For instance, on a 0° C. substrate the evaporation rate for HDODA (Hexanediol Diacrylate) is more than 3 μm/s. At a web speed of 10 m/min, with 10 cm between evaporator and cure, 1.82 μm of HDODA will be lost (between the evaporator and cure positions) with an error of 67.5 nm for every 1° C. error in substrate temperature.

Another numerical value that is relevant to system performance is the fraction (f) of monomer that evaporates from the substrate between the evaporator (edge of the aperture) and cure positions (the distance $w_p$ shown in FIG. 4) relative to the amount that is on the substrate as the substrate exits the evaporator. A high value of f may or may not indicate an unstable process, but it certainly indicates an inefficient process in which most of the monomer ends up as gas in the chamber. Manipulation of Equation 4a gives:

$$f = \frac{w_p}{w_e} \cdot \frac{W(T_{sub})}{W(T_{gas}) - W(T_{sub})}$$

Equation 5

Related to the monomer that ends up in the vacuum chamber is the pressure rise that this monomer causes and the gas load that it creates for the pumping system. Therefore, it is useful to convert the monomer flux that is escaping into the vacuum chamber, and through the vacuum pumps or onto the walls, to an equivalent flow of monomer gas (F at standard temperature and pressure in standard cubic cm per minute, sccm) for comparison to other process gas flows and estimation of the resultant rise in chamber pressure.

Before calculating this flow it is important to consider three aspects of the process in the idealized model. First, in the ideal evaporator, some fraction of the monomer re-emitted from the substrate while the web is positioned above the evaporator aperture escapes to the chamber while, after passing the aperture, all re-emitted monomer is lost to the chamber. Second, no monomer can exist on the substrate after the substrate exits the evaporator unless $T_{sub} < T_{gas}$ because monomer would be re-emitted at a higher rate than it is deposited when $T_{sub} > T_{gas}$. Third, when $T_{sub} < T_{gas}$ there can be no resultant film thickness by the cure position unless a minimum threshold thickness of monomer is deposited onto the substrate as it is over the aperture. Since the monomer is re-emitted at a constant rate, and no more is being deposited outside of the evaporator, a constant thickness (for constant distance and temperature) always evaporates between the evaporator and the cure station. Thus, if the amount on the substrate is less than this constant value it is all evaporated by the time the cure station is reached. In an experiment where film thickness is measured as a function of $w_p$, one would measure zero thickness as $w_p$ is reduced from infinity towards some threshold value of $w_{pth}$, the distance from the edge of the aperture at which all monomer re-vaporizes from the substrate. As $w_p$ moves from $w_{pth}$ to 0 (at the edge of the evaporator aperture) a linear increase in thickness with increasing $[w_{pth}-w_p]$ would be observed. At $w_p=0$, the maximum thickness, resulting from polymerizing the entire net accumulation of monomer due to traversing the aperture, would be measured.

Assume an efficiency, $0 \leq \epsilon \leq 1$, for monomer re-emitted over the evaporator to return to the evaporator. If the evaporator were pressed tightly against the substrate with no gaps leading to the chamber, all re-emitted monomer would return, and the efficiency would be $\epsilon=1$. However, as the size of gaps increases, and/or the width of the aperture decreases, $\epsilon$ tends towards zero and it becomes more likely that re-emitted monomer would escape from the evaporator. The efficiency for re-emitted monomer to escape is just $1-\epsilon$. Starting from Equation 3a, with a monomer of gram Molecular Weight, MW, and inserting some proportionality constants to convert from g/s to sccm per m of web width, one finds the flow (F) of monomer gas into the chamber and through the pumps to be:

$$F = \left( \frac{100 \cdot 60 \cdot 22,400}{MW} \right) \cdot [(1-\varepsilon) \cdot w_e + w_p] \cdot W(T_{sub})$$

Equation 6

(sccm per m of web width)

For a vacuum pumping speed of $S_v$ 1/s, one then finds the monomer partial pressure, per m of web width, P to be:

$$P = \frac{F}{78.95 \cdot S_v} \text{ (torr per m of web width)}$$

Equation 7

The larger F and P the more burden on the pumps. Eventually, if P gets large enough, impingement on other surfaces will become significant and the substrate, after cure, may accumulate condensation that is rolled up into the take-up reel. On unwinding the product, undesirable tacky material may be adhered to the web.

The resultant film thickness' formed by the present invention are determined by the temperature difference between the liquid reservoir and the substrate and the time that is required to move from the evaporator to the cure station. The model above can be used to predict the thicknesses of deposited films under a variety of conditions. This may be done by entering into the model geometric data, liquid and substrate temperature, web speed, and vacuum pump speed for the system. The only external data required is the vapor pressure versus temperature characteristics for the monomer (i.e. A, B, and C in Equations 1 and 2), data that is available for some monomers of interest in the literature.

Figure 6:
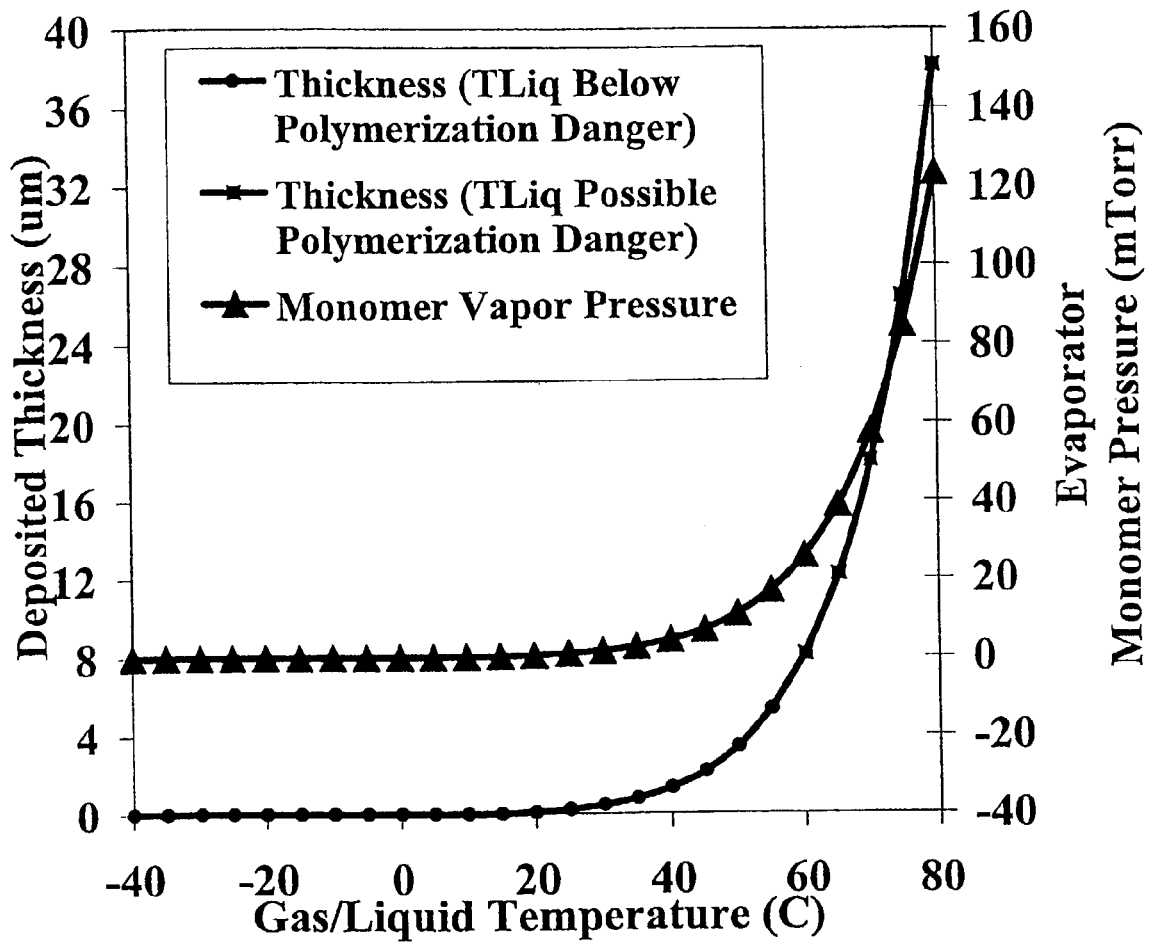
FIG. 6 shows calculated plots of the deposited film thickness and monomer vapor pressure vs. gas/liquid temperature for (a) tripropylene glycol diacrylate and (b) 1,6-hexanediol diacrylate using the model of the present invention.
Figure 6:
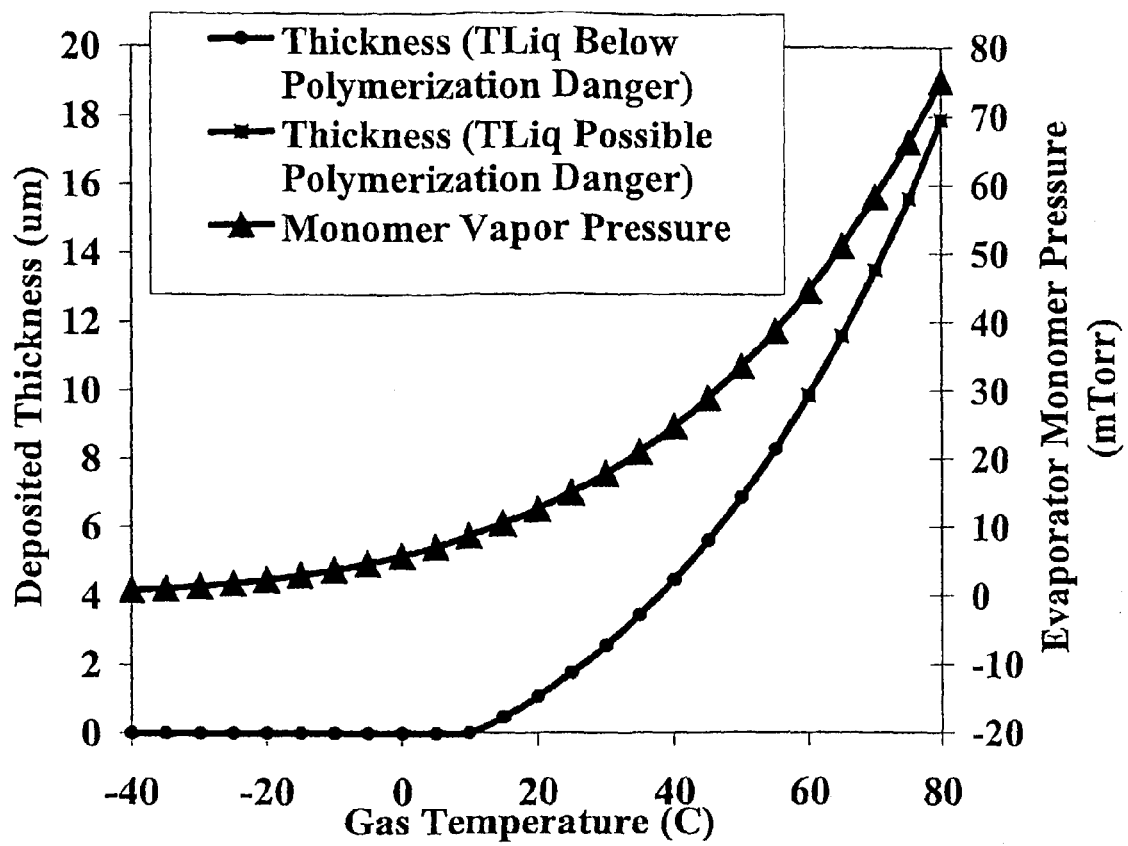

For the monomers tripropyleneglycol diacrylate (TR-PGDA) with a substrate temperature of 10° C. (MW=300; density=1.04 g/cm$^3$) and 1,6-hexanediol diacrylate (HDODA) with a substrate at 0° C. (MW=226; density=1.02) the model for a web coating process described above has been used to predict film thickness' (d) as a function of the gas/liquid temperature. The substrate temperatures chosen were the minimum allowable for each monomer since, for substrate temperatures any lower, the monomer mobility becomes too low for proper polymerization. FIGS. 6 (a) and (b) show plots of the film thickness at cure vs. the gas/liquid temperature of the monomer in the vaporization chamber. The monomer pressure is also shown. The parameters used in calculations using the model are shown in FIGS. 6 (a) and (b).

FIGS. 6 (a) and (b) clearly show that the temperature difference between the monomer in the evaporator and the substrate must be large enough that there is still condensed monomer, of the correct thickness, on the substrate at the position of the cure station. That is above about 15° C. for TRPGDA and above about 10° C. for HDODA. Further calculations with the models show that as the liquid temperature and velocity rise, or the substrate temperature drops, thickness control improves. However, the chamber pressure depends solely on the substrate temperature.

Further, the model shows that for a web system where there is a short time (on the order of a few tenths of a second or less) between the evaporator and cure station positions, reasonable thickness control can be attained with relatively low chamber pressures (10$^{-4}$ torr to 10$^{-5}$ torr).

In a batch process mass balance calculations show the difference between $T_{gas}$ in an evaporator of the present invention and $T_{gas}$ of a closed system in equilibrium is dependent upon the ratio of the evaporator aperture area to the evaporator liquid area, or $A_e/A_{liq}$. For $A_e$<5% of $A_{liq}$, calculations show the difference between $T_{gas}$ in an evaporator with an open aperture and the equilibrium system value of $T_{gas}=T_{liq}$ for a closed evaporator at $T_{liq}$=50° C. is less than 0.25° C. Under the conditions of FIGS. 6 (a) and (b), this would mean an initial thickness error of 0.9% for HDODA and 2.2% for TRPGDA when the shutter is first opened. Further, kinetic arguments from Affinito 1 and 2 indicate that the time required for the gas to reach steady state, for such small perturbations from steady state, is much less than a second after the source shutter is opened. Thus, if a sealed evaporator is opened the change in $T_{gas}$ between when it is first opened and the steady state value is small, and the time needed to reach this value is short. Therefore, a preferred evaporator for practice of the present invention would be a sealed system with a variable area aperture, as described herein. Based upon the substrate speed and $T_{gas}$, the aperture can be opened to the desired width to produce the desired thickness. FIGS. 6a and 6b show that evaporators of the present invention have reasonable net deposition rate and good process thickness control characteristics. The substrate in a batch process is simply moved past a close-coupled evaporator/cure station at a constant speed. The aperture is opened just as the substrate arrives and is closed immediately after it passes. To minimize thickness variations due to process variations, the speed and $T_{gas}$ are set as high as possible while $T_{sub}$ and the evaporator-to-cure separation are set as low as possible. The maximum value of $T_{gas}$ is the highest possible temperature at which there is no danger of polymerization within the evaporator (generally between about 50° C. and 80° C., depending on the monomer). The minimum value of $T_{sub}$ is the lowest temperature at which the monomer mobility remains high enough to permit proper polymerization (typically between 0° C. and 20° C., depending on the monomer). Calculations then show thickness control in batch processes is the same as in web processes (at equal substrate speeds).

While the invention has been described in detail and with reference to specific and general embodiments thereof, it will be apparent to one skilled in the art that various changes and modifications can be made therein without departing from the spirit and scope thereof.

The invention claimed is:

1. A method of forming a polymer coating on a surface of a substrate in a vacuum chamber evacuated to a pressure of less than about 10$^{-2}$ Torr, wherein the method comprises:
   (a) providing in the vacuum chamber an evaporation chamber, wherein the evaporation chamber comprises a reservoir of a liquid monomer, wherein the monomer has two or more olefinic groups per molecule and a vapor pressure in the range of 10$^{-6}$ to 10$^{-1}$ Torr at standard temperature and pressure, and wherein the reservoir of liquid monomer is heated at a temperature below that at which thermal polymerization of liquid monomer is initiated, thereby forming a vapor of the monomer;
   (b) allowing the vapor formed by heating the reservoir of liquid monomer to flow to the surface of the substrate, the surface at a temperature below the temperature of the liquid monomer reservoir or vapor;
   (c) condensing the vapor on the surface of the substrate to deposit a monomer layer on the surface of the substrate; and
   (d) polymerizing the monomer layer formed in step (c) to form the polymer coating on the surface of the substrate.

2. The method of claim 1, wherein step (a) further comprises forming the vapor in a heated evaporation chamber, the heated evaporation chamber comprising parallel sides and a gated aperture, the gated aperture adjustable to provide a cross-sectional area from 0 to 30% of the surface area of the reservoir of liquid monomer in the heated evaporation chamber.

3. The method of claim 1, wherein step (a) further comprises heating the liquid monomer to a temperature of less than about 80° C. to form the vapor.

4. The method of claim 1, wherein the surface of the substrate is at a temperature of less than about 30° C.

5. The method of claim 1, wherein the surface of the substrate is at a temperature of less than about 20° C.

6. The method of claim 1, wherein the substrate is a web.

7. The method of claim 1, wherein the polymerization is induced by a radiation source.

8. The method of claim 7, wherein the radiation source comprising one or more of the group consisting of e-beam and ultraviolet radiation.

9. The method of claim 1, wherein the vapor pressure of the liquid monomer is from about $10^{-2}$ to about $10^{-4}$ Torr at standard temperature and pressure.

10. The method of claim 1, wherein the molecular weight of the monomer is from about 150 to 800.

11. The method of claim 1, wherein the liquid monomer comprises one or more of the group consisting of glycol acrylates, polyglycol acrylates, and polyol polyacrylates.

12. The method of claim 1, wherein the liquid monomer is selected from the group consisting of hexanediol diacrylate, trimethylolpropane triacrylate, and tripropyleneglycol diacrylate.

13. The method of claim 1, wherein the coating formed in step (d) is from about 0.005 µm to about 10 µm in thickness.

14. The method of claim 1, wherein the coating formed in step (d) is from about 0.01 µm to about 1 µm in thickness.

15. The method of claim 7, wherein the substrate is a web moving past the radiation source.

16. The method of claim 1 wherein evaporation is not carried out with a flash evaporation process.

17. A method of forming a two-part coating on a substrate in a vacuum chamber:

(a) sputtering a first layer onto the substrate;
(b) forming a second layer by:
　(i) exposing the substrate to a vapor of monomer, wherein the vapor is formed by heating a reservoir of liquid monomer in an evaporation chamber, wherein the evaporation chamber is positioned in the vacuum chamber, at a temperature below that at which thermal polymerization of the monomer is initiated, wherein the liquid monomer has two or more olefinic groups per molecule, and a vapor pressure in the range of $10^{-6}$ to $10^{-1}$ Torr at standard temperature and pressure;
　(ii) allowing the vapor formed by heating the reservoir of liquid monomer to flow to the surface of the substrate, the surface at a temperature below the temperature of the liquid monomer reservoir or vapor;
　(iii) condensing the vapor on the surface of the substrate to deposit a monomer layer on the surface of the substrate; and
　(iv) polymerizing the monomer layer formed in step (c) to form the polymer coating on the surface of the substrate.

18. The method of claim 17 wherein steps (b) is performed prior to step (a).

19. The method of claim 17 wherein the first layer is a metal or metal oxide layer.

* * * * *